United States Patent
Christensen et al.

(10) Patent No.: US 7,856,345 B2
(45) Date of Patent: Dec. 21, 2010

(54) METHOD FOR BUILDING AND MANAGING A WEB SITE

(75) Inventors: Jakob H. Christensen, Kastrup (DK); Ole S. Thrane, Valby (DK)

(73) Assignee: Sitecore A/S, Copenhagen V (DK)

( * ) Notice: Subject to any disclaimer, the term of this patent is extended or adjusted under 35 U.S.C. 154(b) by 1395 days.

(21) Appl. No.: 10/300,830

(22) Filed: Nov. 21, 2002

(65) Prior Publication Data
US 2003/0121004 A1 Jun. 26, 2003

Related U.S. Application Data

(60) Provisional application No. 60/331,766, filed on Nov. 21, 2001.

(51) Int. Cl.
*G06G 7/48* (2006.01)
(52) U.S. Cl. .......................... 703/4; 715/234; 715/235; 715/236; 715/237; 715/238; 715/239; 715/240; 715/241; 715/242; 715/243
(58) Field of Classification Search .................. 705/530; 703/4
See application file for complete search history.

(56) References Cited

U.S. PATENT DOCUMENTS

| | | | |
|---|---|---|---|
| 5,381,523 A | 1/1995 | Hayashi | |
| 2001/0034765 A1 | 10/2001 | Bimson et al. | |
| 2002/0049788 A1* | 4/2002 | Lipkin et al. | ................. 707/513 |

FOREIGN PATENT DOCUMENTS

WO     WO 01/09834 A1     2/2001

OTHER PUBLICATIONS

"Performance Analysis of Dynamic Web Page Generation Technologies". Kothari et al. Department of Computer Science, Worcester Polytechnic Institute. Jul. 2000.*
Patent Abstracts of Japan, vol. 1996, No. 10, Oct. 31, 1996, 4 pages.
Lloyd Rutledge, "SMIL 2.0: XML for Web Multimedia," IEEE Internet Computing, Sep.-Oct. 2001, IEEE, USA, vol. 5, No. 5, pp. 78-84.

* cited by examiner

*Primary Examiner*—Kamini S Shah
*Assistant Examiner*—Saif A Alhija
(74) *Attorney, Agent, or Firm*—Birch, Stewart, Kolasch & Birch, LLP

(57) ABSTRACT

A method for managing and/or producing an output, the method comprising the steps of providing one or more layouts, each layout being divided into a number of zones, the one or more layouts in combination at least substantially covering the output; providing a number of rendering elements, each being adapted to perform a function and/or an action; assigning one or more relations and/or one or more orderings between the rendering elements and the zones; processing the zones of the one or more layouts according to the one or more relations and/or the one or more orderings, and by means of the rendering elements; providing, for each of the zones, an output based on the rendering elements and the one or more relations and/or orderings; and collecting the output of each of the zones into a final output.

21 Claims, 27 Drawing Sheets

$F_1$ $L_1$ $L_3$ $L_4$ $L_1$:

$L_2$:

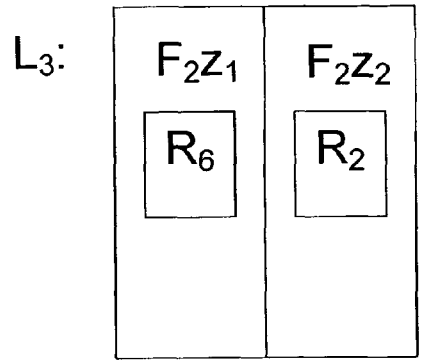
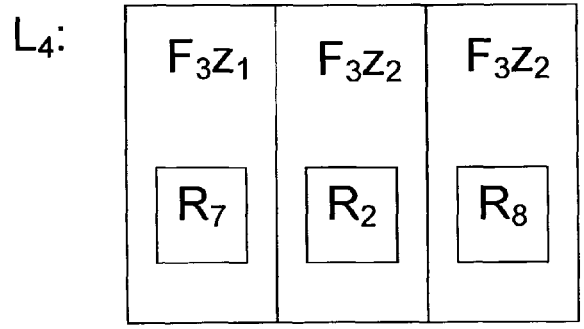
Fig. 5f
Fig. 5g
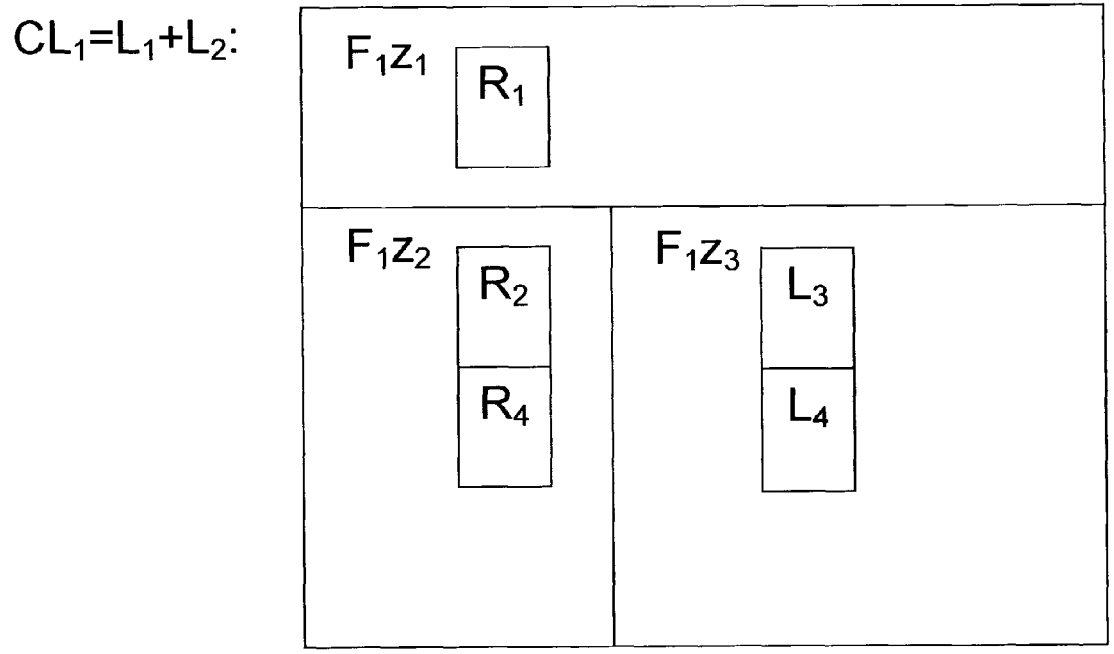
Fig. 5h $CL_2 = L_3 + L_4$:

$CL_1 = L_1 + L_2$:

$F_1$:

$F_2$:

$L_1$:

$L_2$:

$CL_1 = L_1 + L_2$:

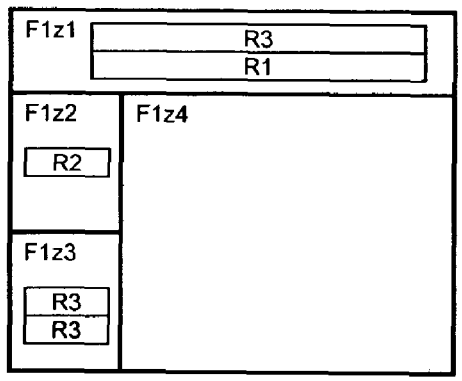
Fig. 9a: $L_1$
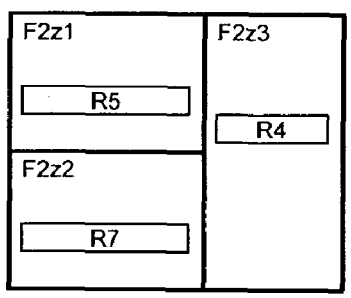
Fig. 9b: $L_2$
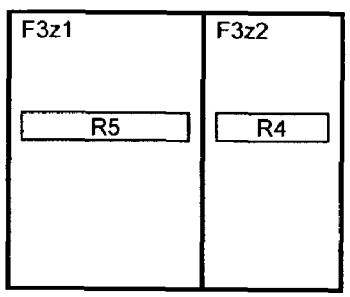
Fig. 9c: $L_3$

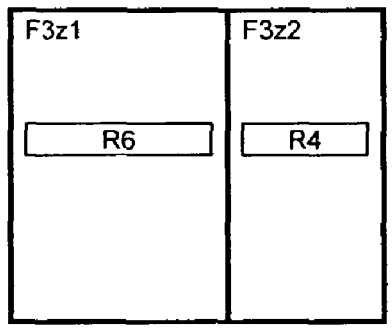
Fig. 9d: $L_4$
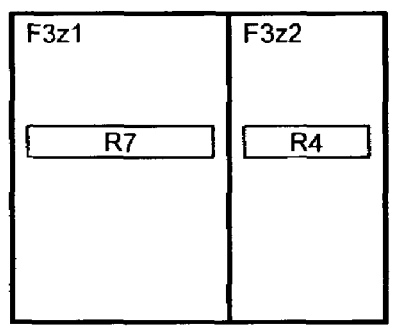
Fig. 9e: $L_5$ $$CL_1 = L_1 + L_2,\ L_2(LD) = L_1 Z_4$$

$$CL_3 = L_1 + L_4,\ L_4(LD) = L_1 Z_4$$

METHOD FOR BUILDING AND MANAGING A WEB SITE

TECHNICAL FIELD

The present invention relates to a method for managing and/or producing an output. In particular the present invention relates to a method for building and managing a web site, in particular for creating, updating and maintaining a web site. The present invention further relates to a web site which has been created and may be updated and maintained using the method.

BACKGROUND OF THE INVENTION

During the past years companies world wide have struggled with creating content management systems (CMS) for web sites. The purpose of a content management system is to allow the content managers (editors) to update the content of a web site as easily as possible. Basically, a content manager is an editor on which the structure and elements of a web site is imposed. So far CMS have been no more than simple editors based around simple observations of the structure of a web site.

CMS also try to solve a second task, namely that of being able to quickly build a new web site. Based on the observations of common web site structures, CMS suppliers attempt to give the user a gallery of web-templates for common web site designs. This has caused a multitude of different CMS because none of the existing approaches has captured the representation of the generic structure of web sites within a single CMS. Whenever one finds a suitable structure there is always an exception to the rules when using the system for a new customer. Present CMS are therefore typically designed for special purpose web sites such as for example info sites, eCommerce or Portals. These systems thus limit the functionality to what a typical web site of a certain type would need/require. For example, the user might need to put the content into a template as shown in FIG. 1.

In the sample template of FIG. 1 the user could typically choose to put the menu in $Area_2$, some design in $Area_1$, and the textual content in $Area_3$. Obviously, basing a web site on fixed templates, or a template gallery, will always lead to shortcomings. Good examples of such CMS include the CMS made by Oracle.

SUMMARY OF THE INVENTION

It is an object of the present invention to provide a content management system (CMS) for web sites which provides an easy to use tool for creating web sites which does not impose restrictions on the obtainable complexity of the resulting web site.

It is a further object of the present invention to provide a CMS for web sites which provides a tool for easily updating and/or maintaining the web site.

It is an even further object of the present invention to provide a CMS for web sites which has a high degree of reuse of components on the web site.

It is still a further object of the present invention to provide a web site which may easily be created, updated, and/or maintained, without having a limited complexity.

According to a first aspect of the present invention the above and other objects are fulfilled by a method for managing and/or producing an output, the method comprising the steps of:

providing one or more layouts, each layout being divided into a number of zones, the one or more layouts in combination at least substantially covering the output, providing a number of rendering elements, each being adapted to perform a function and/or an action, assigning one or more relations and/or one or more orderings between the rendering elements and the zones, processing the zones of the one or more layouts according to the one or more relations and/or the one or more orderings, and by means of the rendering elements, providing, for each of the zones, an output based on the rendering elements and the one or more relations and/or orderings, and collecting the output of each of the zones into a final output.

According to a second aspect of the present invention the above and other objects are fulfilled by a web site comprising:

one or more layouts, each layout being divided into a number of zones, the one or more layouts in combination at least substantially covering the web site, an output which has been generated by a number of rendering elements based on one or more relations and/or one or more orderings between the rendering elements and the zones.

The one or more layouts in combination define the final output, e.g. what is to be presented on a resulting web site, and how it is to be presented. For example, one layout may define the basic output, e.g. the overall design of a web site, while other layouts may define the design/contents of various areas or zones, e.g. various areas of a web site and/or the design/contents of individual elements of the web site. In this example, the layouts defining the design/contents of various areas and/or the design/contents of individual elements, normally refer to the layout defining the overall design of the web site. Thus, the position of one or more particular elements or one or more particular groups of elements of the output may easily be changed by simply performing the necessary changes with respect to, e.g., the layout defining the basic output. Similarly, the design/contents of a particular element may be changed, updated and/or maintained by simply performing the necessary changes to the layout(s) which define the design/contents of that element. Thus, the method provides a tool for creating, updating and maintaining an output, e.g. a web site. Furthermore, the method does not impose restrictions on the possible complexity of the final output, such as the resulting web site.

The rendering elements are adapted to perform a function and/or an action. This may comprise generating an output which can be visualised. When a relation between a rendering element and a zone is established, an output of that zone is therefore provided. There may be established relations between a number of rendering elements and a particular zone. In this case the final output of that zone is a combination of the results of the functions and/or actions performed by the rendering elements in question. This may result in an output having a high degree of complexity.

Furthermore, the orderings of the rendering elements in relation to each other and in relation to a certain zone may be very important for the final output, e.g. the appearance of a web site, because the ordering usually is of consequence to the final appearance.

The invention thus provides a new dynamic method for rendering arbitrarily complex designs. The invention is based on very fundamental observations which, when put together in the correct fashion, allows the representation of structures of unlimited complexity with unprecedented reuse of components.

Programmers and developers may use a program designed around the invention to create new component based web sites very quickly and easily. Likewise it is simple to impose the editor on top of the dynamic structure and hence give content managers (editors) a versatile tool for updating the content. Thus, the present invention will have a great impact on the work of programmers, developers, and editors alike.

The basic observation and invention evolve around these observations:

Visual representations can be split into areas. Each area is in itself a visual representation and can be split further into areas. A rendering function can generate visual output. A rendering function may also perform programmatic actions. Rendering functions can be assigned to an area. Each area can be rendered separately. Rendering within one area can occur multiple times with possibly different rendering functions. Areas can be collected in groups (a framework) as a visual representation. Combining all frameworks generate the final visual presentation.

A programmatic function may, e.g., be generating sounds, fetching data, checking login, performing redirections, searching, form handling, and/or performing calculations. Furthermore, a programmatic function (in the rendering element) may generate a visual output.

The method may further comprise the step of assigning one or more relations and/or one or more orderings between at least one of the one or more layouts and the zones. In this case a relation and/or an ordering between a layout, in itself defining a number of zones, and a zone may be provided. Thus, a full layout may be 'embedded' in a zone defined by another layout, e.g. a layout defining the overall design of the web site. Thus, it is possible to have a number of 'sub-zones' within a zone.

The method may even further comprise the steps of:

processing the zones of the one or more layouts according to the one or more relations and/or the one or more orderings, and by means of the rendering elements and the layouts, and recursively resolving all of the layouts into rendering elements until each zone and each layout can be rendered using rendering elements.

Thus, in case a relation is provided between a layout and a zone by means of another layout, the first layout is first resolved, and the result is then applied to the zone. Thus, the final output defined by the rendering elements of the first layout is embedded into the zone. This makes it very easy to manage the web site.

The step of processing the zones may be performed in such a way that each zone is processed independently of each of the other zones. Thus, the contents/design of one zone may be completely independent of the contents/design of any of the other zones.

Alternatively or additionally, the step of assigning one or more relations and/or one or more orderings between the rendering elements and the zones may be performed in such a way that, for at least one of the zones, relation(s) and/or ordering(s) between said zone(s) and two or more rendering elements is provided. Thus, two or more (or even several) rendering elements may be connected/assigned to a particular zone. Accordingly, that zone may comprise several design elements, resulting in a final output without restrictions on the possible complexity. This is a very important advantage.

The step of assigning one or more relations and/or one or more orderings between the rendering elements and the zones may comprise combining at least two layouts in such a way that, for each zone, the relation(s) and/or ordering(s) comprises an addition of the relation(s) and/or ordering(s) for each of the at least two layouts. This is a relatively simple way of combining the layouts. In order to determine the relation(s) and/or ordering(s) related to a given zone, one simply looks at the relation(s) and/or ordering(s) originating from each layout, and the result is added. This will be described further below.

In case at least two layouts are provided, one of the two or more layouts may define the basic structure of the output, and one or more of the other layout(s) may define the contents of one or more of the zones. In this case the 'basic' layout may determine the overall design of a web site, such as the position of certain basic element, e.g. the position of a menu, the position of a main information field, the mutual sizes of certain-elements, etc. The other layouts, on the other hand, may determine the actual design/contents of certain elements, e.g. a menu, a header, a main information field, etc.

Alternatively, two or more layouts may define the basic design of the web site, e.g. in case the site has more than one type of appearance.

The method may further comprise the step of redefining the final output by altering the one or more relations and/or the one or more orderings between the rendering elements and the zones. Thus, the final output, e.g. the contents of a web site and/or the position of certain elements, may easily be altered by simply making the necessary alterations to the relevant relations/orderings.

Alternatively or additionally, the method may further comprise the step of redefining the final output by altering one or more of the rendering elements and/or by replacing one or more of the rendering elements with one or more different rendering elements. Thus, the final output, e.g. a web site, may easily be updated or maintained by simply making the necessary alterations to the relevant rendering elements, or by simply using a different rendering element for a specific purpose. An element may thus be updated/altered without affecting the other elements of the output. This is a very important advantage since it makes it provides a versatile tool for the manager of the output, e.g. a web manager, for updating/maintaining the output.

The method may further comprise the step of making the output available via a communication network. Preferably, the communication network is a global communication network, such as the Internet. However, it may alternatively be a local computer network with only a limited number of users having access to the web site, or it may be GSM, iMOde, UMTS, etc.

Possibly, the used data format is based on Extensible Markup Language (XML), and/or the rendering elements are based on Extensible Stylesheet Language Transformations (XSLT). Furthermore, formats such as HTML, Text-TV, Video, WAP, iMOde, Graphics, Text, and Sound may be used. The rendering elements may be based on NET.

The method may further comprise the step of generating structured data by means of the rendering elements. The structured data is preferably generated by the rendering elements. Thus, in this case, in addition to generating a visual output, the rendering elements are adapted to generate an output of structured data, e.g. XML, XSL, CSV, HTML, WAP, Programming languages, binary data, etc. Web services may be generated by means of the rendering elements.

The output may comprise at least part of the contents of a web site. In this case the final output preferably comprises at least part of the visual appearance of the web site. The web site is easily produced and managed using the method according to the invention.

The rendering elements may be adapted to generate an output, such as a visual output. In the latter case the step of collecting the output of each of the zones into a final output is preferably performed by displaying the visual output of each of the zones.

Alternatively or additionally, the rendering elements may be adapted to process a layout. Thus, in case a layout is embedded in another layout, a rendering element may be adapted to process the embedded layout, thereby providing a possibility of recursively processing the layouts.

The method may further comprise the steps of:
caching the output from one or more of the zones and/or from one or more of the rendering elements and/or from one or more of the layouts, and/or the final output, and using the cached output at a later time.

In case the step of processing the zones and/or the step of collecting the output of each of the zones is/are very time consuming, e.g. because many calculations are required, it may be desirable to cache the result, so that it is possible to use it at a later time. This will save computing time.

At least one of the rendering elements may comprise an ordered sequence of rendering elements, the output of each of the rendering elements of said sequence being used as an input to the subsequent rendering element.

The rendering elements may, thus, be related in a 'pipeline'. A pipeline is a series of rendering elements, where the output of a rendering function provides input to the next rendering function. Furthermore, there could be pipelines in the pipeline (feeding the input/output to the next rendering element/pipeline).

The method may further comprise the steps of:
receiving structured data, said structured data being divided into substructures,
assigning one or more layouts to each substructure, and
processing each substructure in such a way that the assigned layout(s) is/are processed, resulting in an output.

When downloading a web site, the computer receives structured data divided into substructures. If one or more layouts are assigned to the substructures, the layout engine will 'know' how to interpret the structured data, i.e. it will 'know' how to 'draw' the layout so as to produce the correct visual output.

In this case the method may even further comprise the step of placing an editor on the structured data.

BRIEF DESCRIPTION OF THE DRAWING

FIGS. 5a-5j illustrate another combine rule according to the invention,

FIGS. 9a-9e show examples of layouts according to the invention.

DETAILED DESCRIPTION OF THE DRAWINGS

Below the following definitions will be used.

Definitions

Grids: A grid is a division of an area into smaller areas. In the following, the areas are illustrated by squares, though this may be any shape. Divisions need not be absolute.

Cell: A cell is one of the divided smaller areas in the grid.

Framework ($F_n$): A framework is a grid representing of the abstraction of what's to be drawn. A framework can have visual properties. A Framework is referenced as $F_n$.

Zone ($Z_n$): A zone is the cell of a framework. A zone can have visual properties. A zone will be referenced as $Z_n$.

Rendering Element ($R_n$): Rendering elements generates output that may be visualized. A rendering element will be referenced as $R_n$.

Layout (L): A layout is a collection of Rendering Elements or (combined) Layouts (recursive) that point to various zones in a given framework. A layout will be referenced as $L_n$.

Combined layout ($CL_n$): A combined layout combines a first (combined) layout with a second (combined) layout. Combined layout will be referenced as $CL_n$.

Combine rule ($CR_n$): A rule describing how to combine layouts/how to combine layouts and combined layouts.

Layout designation (LD): The layout designation points an entire layout L or combined layout CL to a zone Z in a framework F. For example $L_2(LD)=F_1Z_3$. A layout designation will be referenced as $LD_n$.

Mathematical Abstract Definition

Points (→): The point symbol refers to the binding between layouts, rendering elements, zones and frameworks. Eg. $L_n \rightarrow F_m$ means $L_n$ is referencing $F_m$ $$L_n \rightarrow F_m$$

$$R_n \epsilon L_m$$

$$R_n \rightarrow Z_m$$

$$L_n \rightarrow F_m:$$

$$\{R_1 \rightarrow z_1, R_2 \rightarrow z_2, \ldots, R_n \rightarrow z_n | z_1, z_2, z_n \epsilon Z_n\} \cup$$

$$\{L_1 \rightarrow z_1, L_2 \rightarrow z_2, \ldots, L_n \rightarrow z_n | z_1, z_2, z_n \epsilon Z_n\}$$

Depending on the rule $CR_n$, the combined layout would be represented by:

$$CL=CL_1CR_nCL_2CR_m \ldots CL_x$$

Where the Combine rule describes the way to combine two layouts, e.g. the Rule merge (merges zones) or the rule append (append zones).

As the above definitions describe we do have a number of layouts that can be rendered either alone or combined. Each layout points to a specific framework and contains a number of rendering elements that points various zones in the framework.

EXAMPLES

Figure 1:
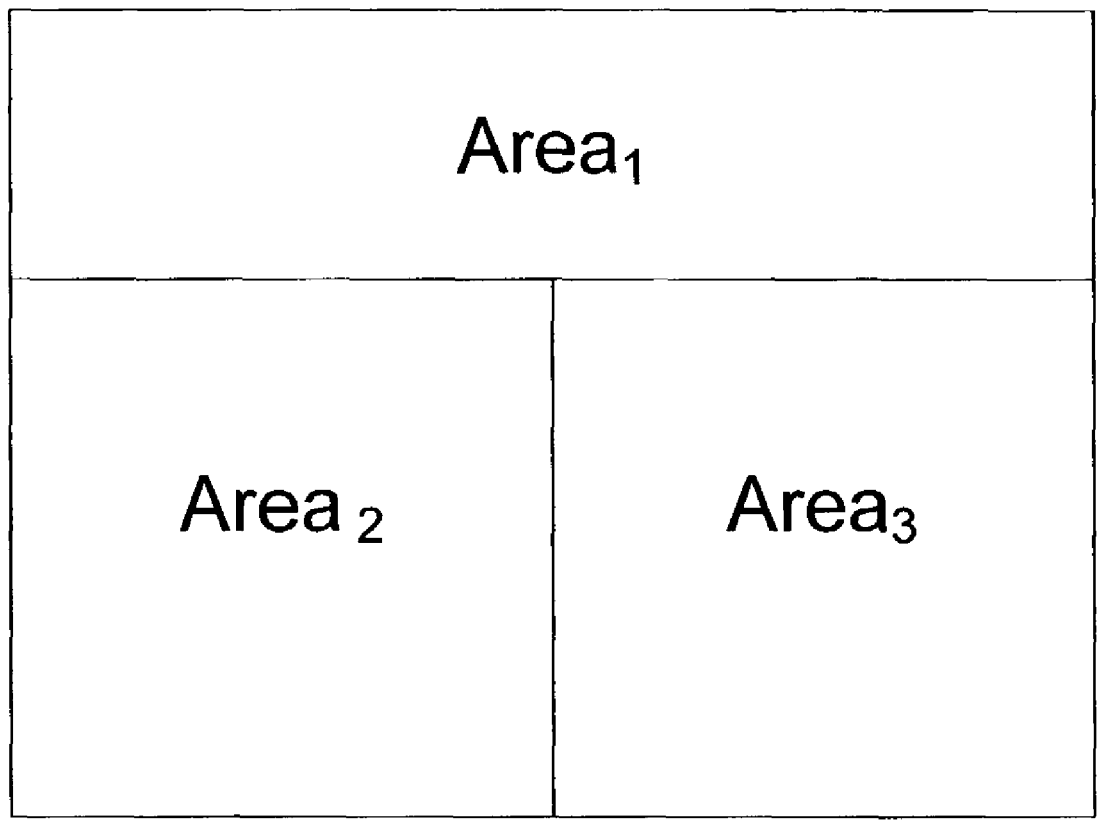
FIG. 1 shows an example of a prior art web site template.
Figure 2A:
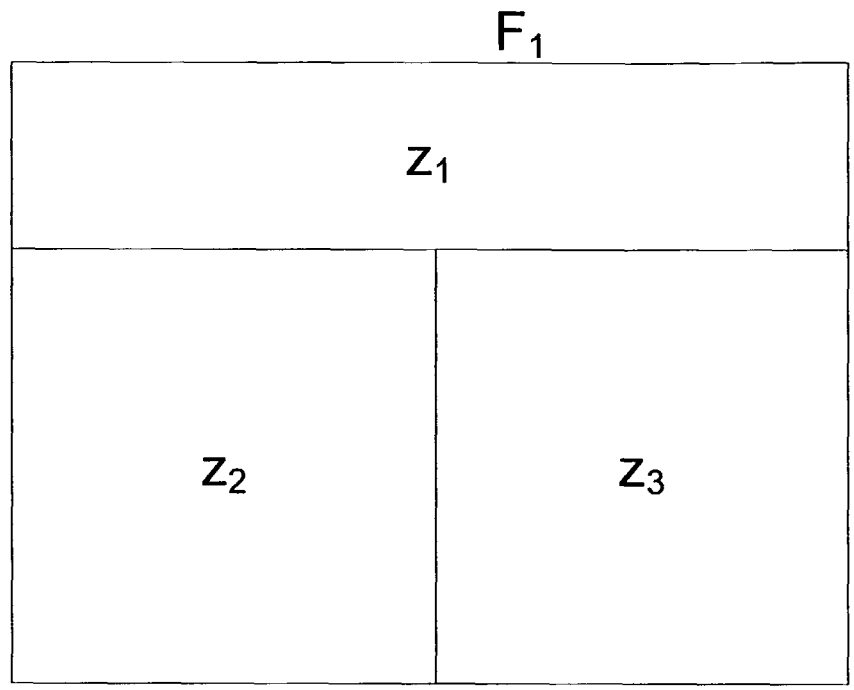
FIGS. 2a-2b show examples of a basic design according to the invention.

A framework $F_1$ could be designed as shown in FIG. 2a. A layout $L_1$ could be designed as follows, pointing to $F_1$ of FIG. 2a:

$$L_1 \rightarrow F_1: \{R_1 \rightarrow F_1z_1, R_2 \rightarrow F_1z_2, R_3 \rightarrow F_1z_2, R_4 \rightarrow F_1z_3, R_5 \rightarrow F_1z_3, R_6 \rightarrow F_1z_3\}$$

Figure 2B:
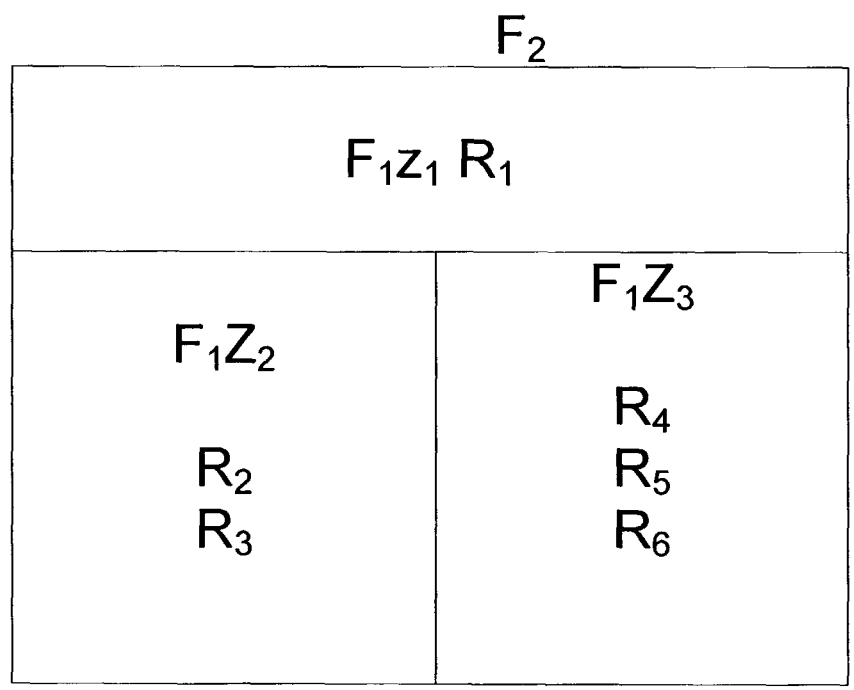

A much clearer representation is illustrated in FIG. 2b, where the rendering elements which are related to a specific zone are depicted in that zone. FIG. 2a shows the resulting visual representation. Note, that the ordering of the elements can impact the way the rendering is performed.

In FIG. 2b, $R_1$ could for example represent a function to generate top graphics, $R_2$ a function to generate a left menu, $R_3$ to generate an advertising spot, $R_4$ to generate a header, $R_5$ to generate textual content and $R_6$ to generate a legal footer.

Combine Rule $CR_1$: Merging

Reference is now made to FIGS. 3a-3d. When combining two layouts, into a combined layout, a merge rule will join the two layouts as explained below:

$$CL_1 = L_1 + L_2$$

Both layouts points to the same Framework, F1, with these sample definitions:

$$F_1\{z_1, z_2, z_3\}$$

$$L_1 \rightarrow F_1: \{R_1 \rightarrow F_1, z_1, R_2 \rightarrow F_1 z_2, R_3 \rightarrow F_1 z_2\}$$

$$L_2 \rightarrow F_1: \{R_4 \rightarrow F_1 z_2, R_5 \rightarrow F_1 z_3\}$$

Given the above data, the Combine rule could be that when merging two layouts that points to the same framework it is done as follows:

$$CL_1 = L_1 + L_2$$
$$= \{(L_1 z_1 + L_2 z_1), (L_1 z_2 + L_2 z_2), (L_1 z_3 + L_1 z_3)\}$$

This makes the zones, $z_1$, $a_2$ and $z_3$ contain:
$CL_1$:

$$z_1 = R_1$$

$$z_2 = R_2 + R_3 + R_4$$

$$z_3 = R_5$$

$$CL_1 = \{(R_1), (R_2 + R_3 + R_4), (R_5)\}$$

Possibly, the rendering function could be assigned an ordering, e.g. $R_2(10)$, $R_3(30)$, R4(20. In this case the result would be $z_2 = R_2 + R4 + R_3$.

Figure 3A:
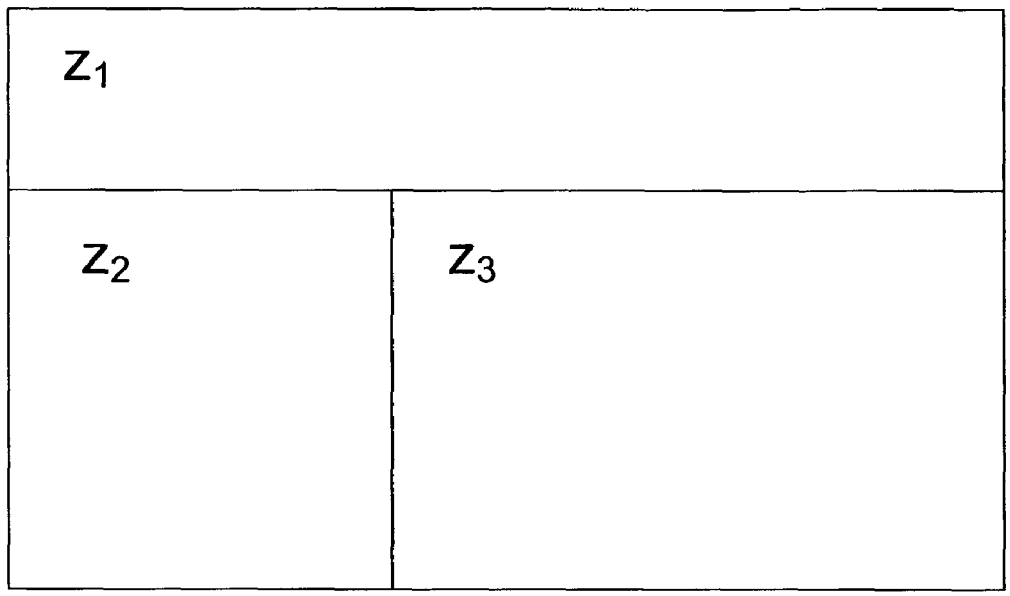
FIGS. 3a-3d illustrate a merging rule according to the invention.

FIG. 3a shows the framework, $F_1$, consisting of three zones.

Figure 3B:
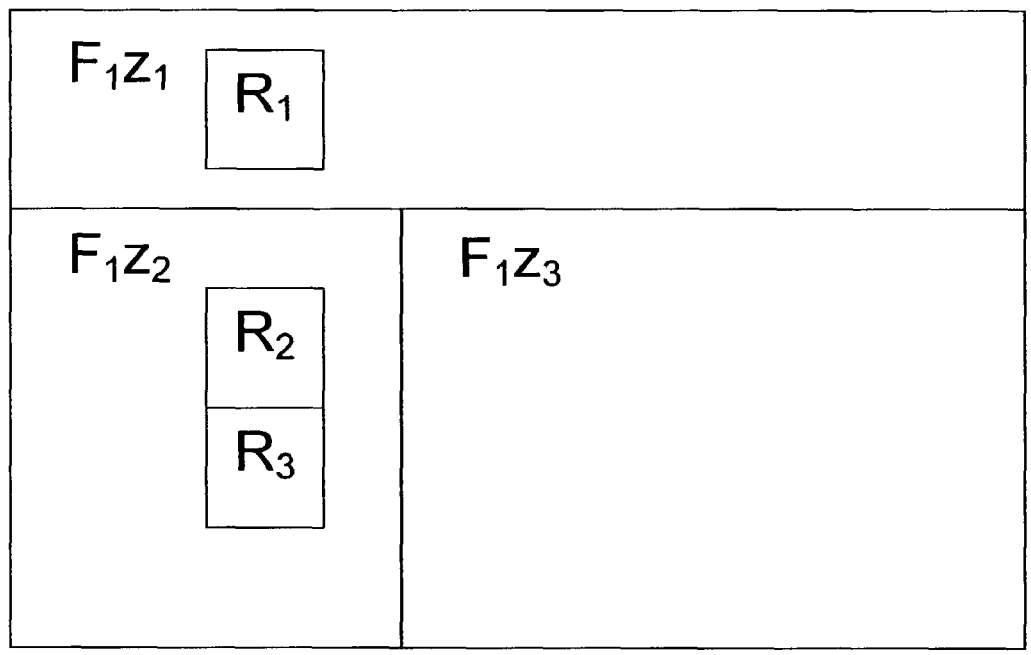

As mentioned above, Layout 1 points to framework 1 and places Rendering element 1 in zone 1 and Rendering element 2 and 3 in zone 2. This is illustrated in FIG. 3b.

Figure 3C:
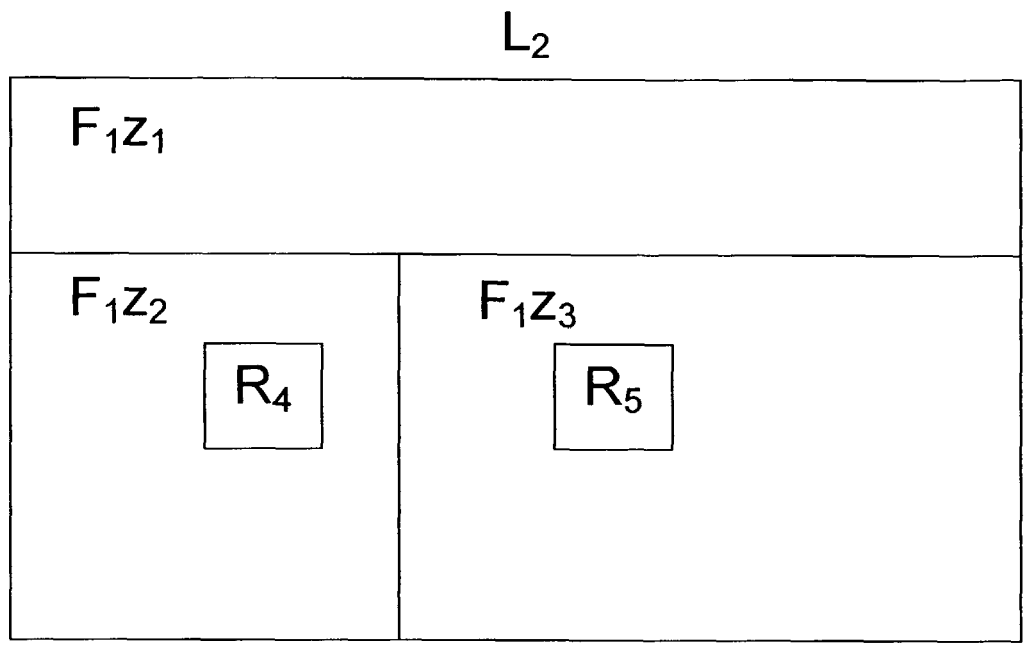

Furthermore, Layout 2 also points to framework 1 but places Rendering element 4 in zone 2 and Rendering element 5 in zone 3. This is illustrated in FIG. 3c.

Figure 3D:
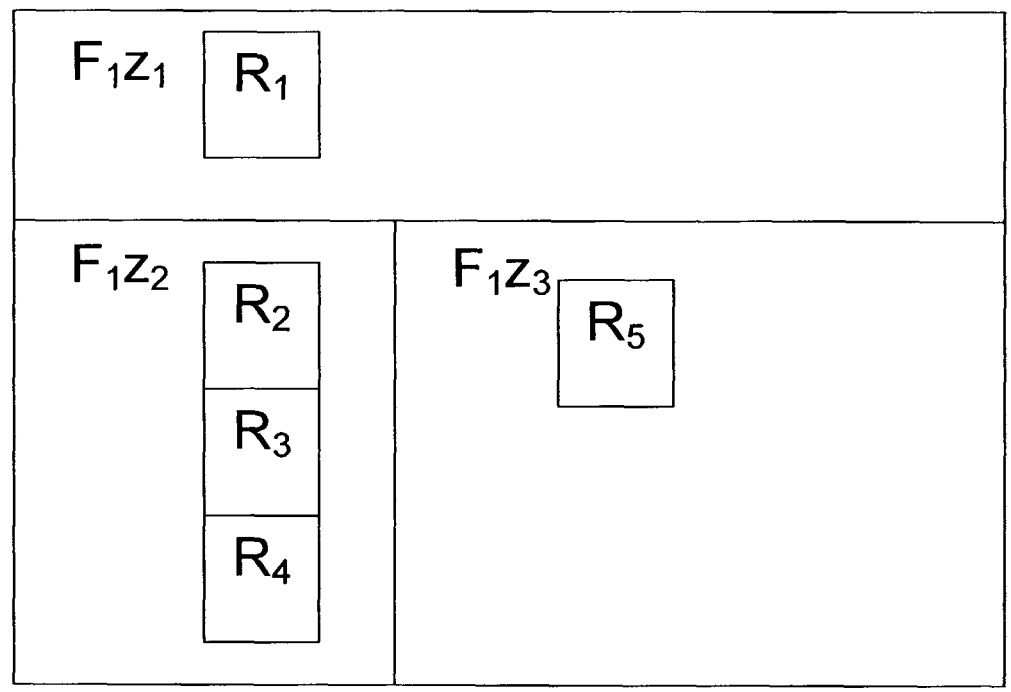

The layouts are now combined, $CL_1 = L_1 + L_2$. Since both layouts points to same framework, Combine Rule 1 applies ($CR_1$). Combine Rule 1 merges each cell in the given order. The result is shown in FIG. 3d.

Combine Rule $CR_2$: Recursive Using $CR_1$

Reference is now made to FIGS. 4a-4i. Each Combined layout is processed individually but recursively. This enables the system to use the merge rule on Layouts:

$$CL_1 = L_1 + L_2$$

$$F_1 = \{z_1, z_2, z_3\}$$

$$F_2 = \{z_1, z_2\}$$

$$L_1 \rightarrow F_1: \{R_1 \rightarrow F_1 z_1, R_2 \rightarrow F_1 z_2, L_3 \rightarrow F_1 z_3\}$$

$$L_2 \rightarrow F_1: \{R_4 \rightarrow F_1 z_2, L_4 \rightarrow F_1 z_3\}$$

$$L_3 \rightarrow F_2: \{R_6 \rightarrow F_2 z_1, R_{2L} \rightarrow_{F2} z_2\}$$

$$L_4 \rightarrow F_2: \{R_7 \rightarrow F_2 z_1\}$$

Given the above statement, the Combine rule knows that when two layouts that points to the same framework the merge rule must be used. Since this is done recursively:

$$CL_1 = L_1 + L_2$$
$$= \{(L_1 z_1 + L_2 z_1), (L_1 z_2 + L_2 z_2), (L_1 z_3 + L_2 z_3)\}$$

This makes the zones, $z_1$, $z_2$ and $z_3$ contain:
$CL_1$:

$$z_1 = R_1$$

$$z_2 = R_2 + R_4$$

$$z_3 = L_3 + L_4 = CL_2$$

Since $L_3$ as well as $L_4$ points to the same framework (with two zones), again the merge rule is to be processed:

$$CL_2 = L_3 + L_4$$
$$= \{(L_3 z_1 + L_3 z_1), (L_4 z_2 + L_4 z_2)\}$$

This makes $CL_2$ zones $z_1$ and $z_2$ contain:
$CL_2$:

$$z_1 = R_6 + R_7$$

$$z_2 = R_2$$

$$CL_2 = \{(R_6 + R_2), (R_7)\}$$

Figure 4A:
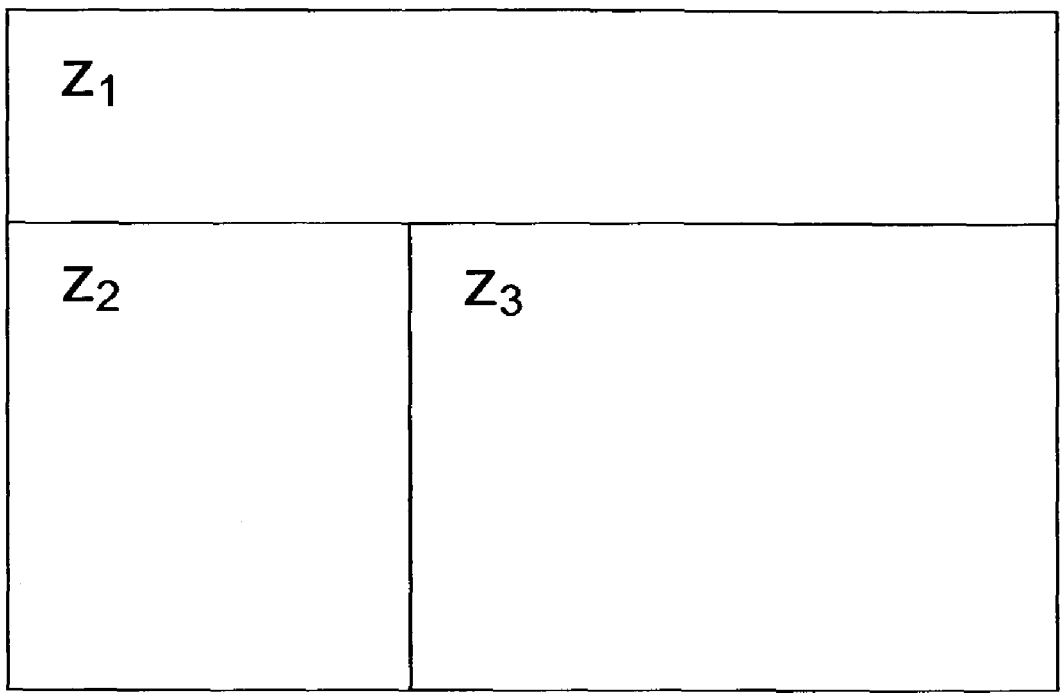
FIGS. 4a-4i illustrate a combine rule according to the invention.
Figure 4B:
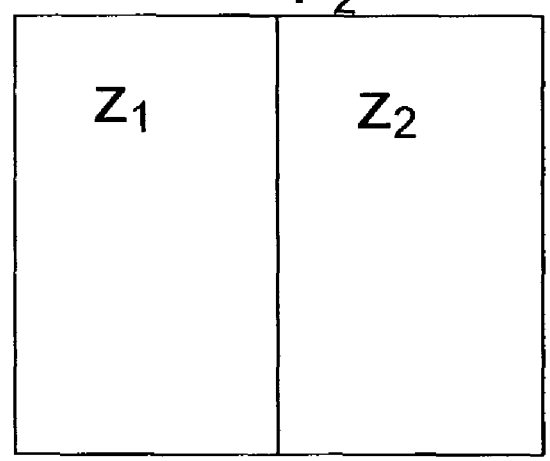

FIG. 4a shows framework, $F_1$, comprising three zones, and FIG. 4b shows framework, $F_2$, comprising two zones.

Figure 4C:
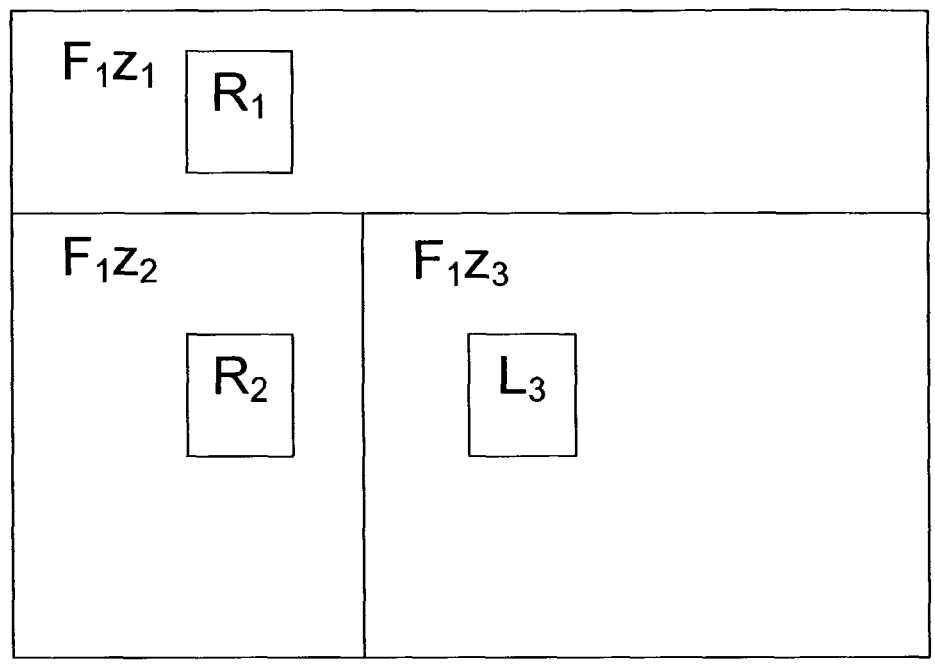
Figure 4D:
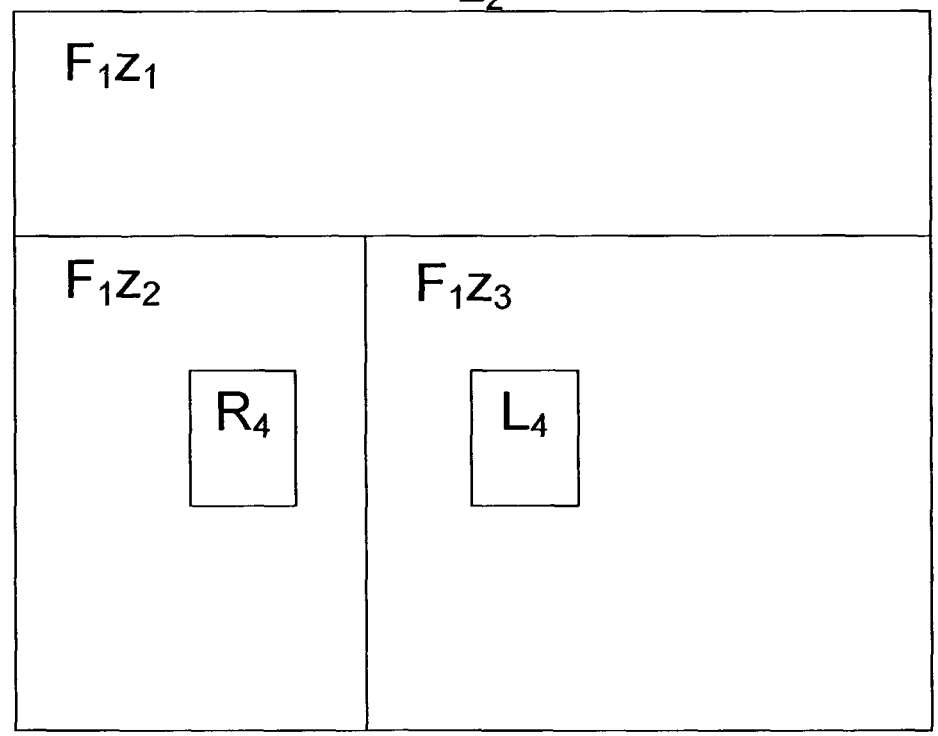

Layout 1 points to Framework 1 and places Rendering element 1 ($R_1$) in zone 1, $R_2$ in zone 2 and Layout 3 ($L_3$) in zone 3. This is shown in FIG. 4c. Equally, Layout 2 points to Framework 1. $R_4$ are placed in zone 2 and Layout 4 are placed in zone 3, as shown in FIG. 4d.

Figure 4E:
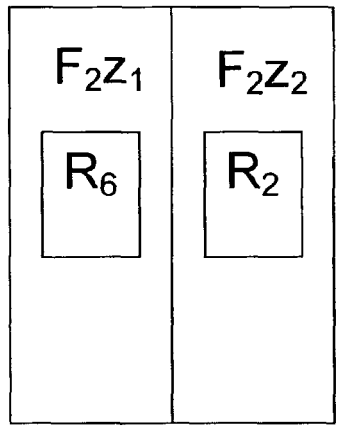
Figure 4F:
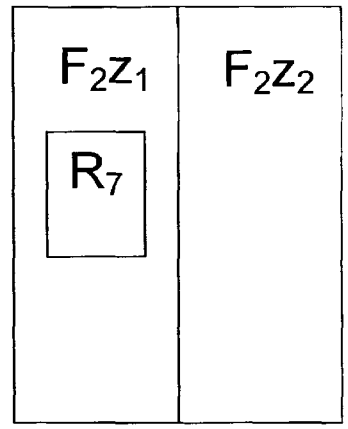

Layout 3 uses another framework, $F_2$, and points $R_6$ to zone 1 and $R_2$ to zone 2 in this framework. This is shown in FIG. 4e. Layout 4 simply places Rendering element 7 into zone 1 in Framework 2, as shown in FIG. 4f.

Figure 4G:
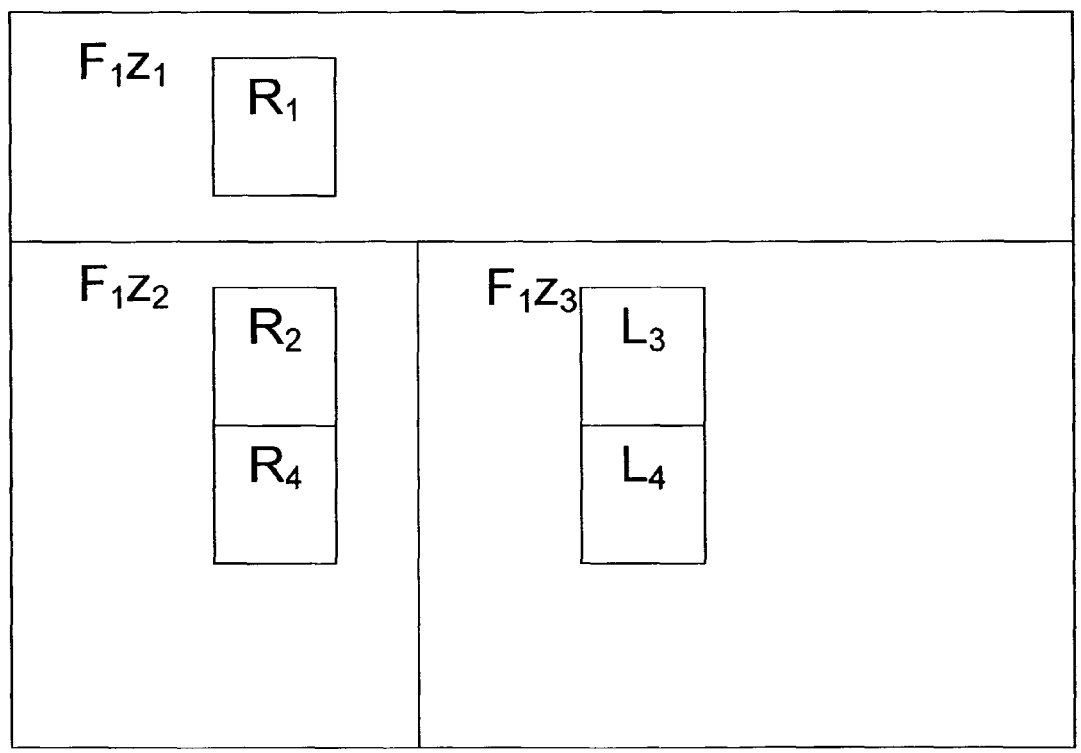
Figure 4H:
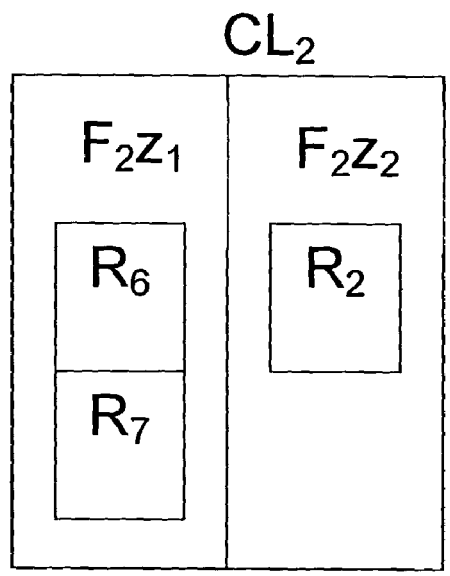

Since Layout 1 as well as Layout 2 uses the same framework, $CR_1$ applies. The result is shown in FIG. 4g. Since the entire process can be used recursively, Layout 4 and 4 must now be processed. Again $CR_1$ applies because layout 3 and 4 both use Framework 2. The result is shown in FIG. 4h.

Figure 4I:
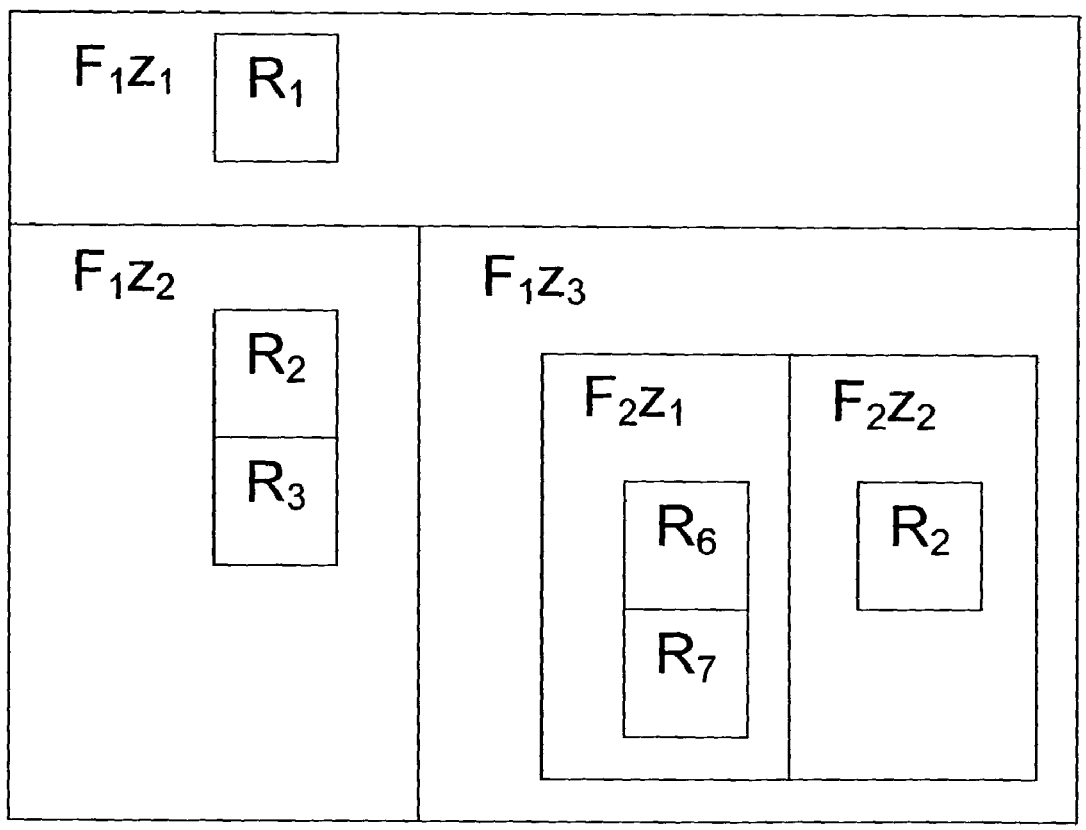

Processed, the $CL_1 = L_1 + L_2$ are displayed as shown in FIG. 4i. As both examples show, the sorting order of the merge is ascending (using the order of factors).

Combined Rule $CR_3$: Append

Reference is now made to FIGS. 5a-5j. As with the merge rule $CR_1$, this applies recursively. This rule applies when combining layouts with different frameworks.

$$CL_1 = L_1 + L_2$$

$$F_1 = \{z_1, z_2, z_3\}$$

$$F_2 = \{z_1, z_2\}$$

$$F_3 = \{z_1, z_2, z_3\}$$

$$L_1 \rightarrow F_1: \{R_1 \rightarrow F_1 z_1, R_2 \rightarrow F_1 z_2, L_3 \rightarrow F_1 z_3\}$$

$$L_2 \rightarrow F_1: \{R_4 \rightarrow F_1 z_2, L_4 \rightarrow F_1 z_3\}$$

$$L_3 \rightarrow F_2: \{R_6 \rightarrow F_2 z_1, R_2 \rightarrow F_2, z_2\}$$

$$L_4 \rightarrow F_3: \{R_7 \rightarrow F_3 z_1, R_2 \rightarrow F_3 z_2, R_8 \rightarrow F_3 z_3\}$$

Given the above statement, the Combine rule knows that when two layouts that do not point to the same framework, the append rule must be used. Since this is done recursively:

$$CL_1 = L_1 + L_2$$
$$= \{(L_1z_1 + L_2z_1), (L_1z_2 + L_2z_2), (L_1z_3 + L_2z_3)\}$$

This makes the zones, $z_1$, $z_2$ and $Z_3$ contain:
$CL_1$:

$z_1 = R_1$ $z_2 = R_2 + R_4$ $z_3 = L_3 + L_4 = CL_2$

Since $L_3$ and $L_4$ points to various frameworks, Combined Layout 2 must be appended:

$$CL_2 = L_3 + L_4$$
$$= \{(L_3z_1), (L_3z_2)\}, \{(L_4z_1), (L_4z_2), (L_4z_3)\}$$

Figure 5A:
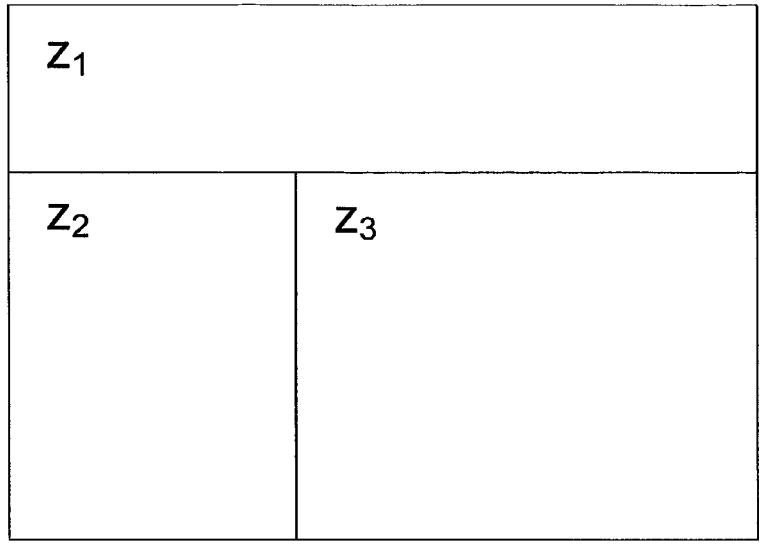
Figure 5B:
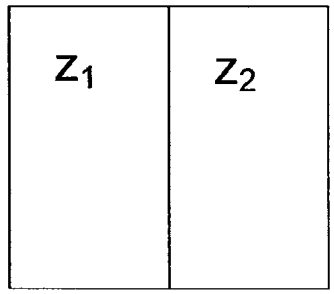
Figure 5C:
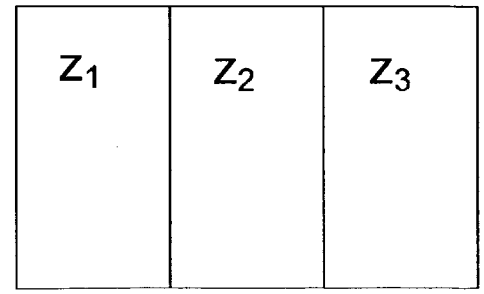

FIG. 5a shows framework, $F_1$, comprising three zones, FIG. 5b shows framework, $F_2$, comprising two zones, and FIG. 5c shows framework, $F_3$, comprising three zones.

Figure 5D:
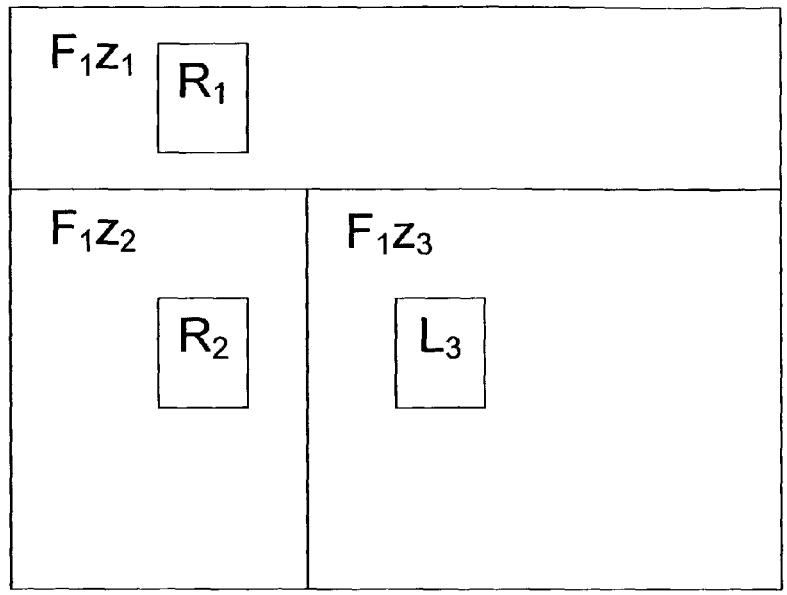
Figure 5E:
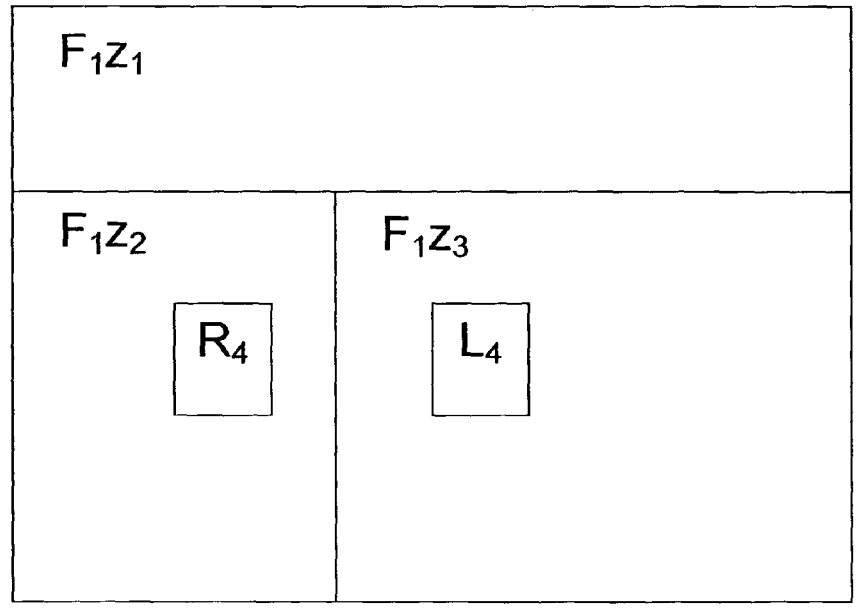

FIG. 5d graphically shows layout, $L_1$, on framework, $F_1$, FIG. 5e shows layout, $L_2$, on framework, $F_1$, FIG. 5f shows layout, $L_3$, on framework, $F_2$, and FIG. 5g shows layout, $L4$, on framework, $F_3$.

Figure 5I:
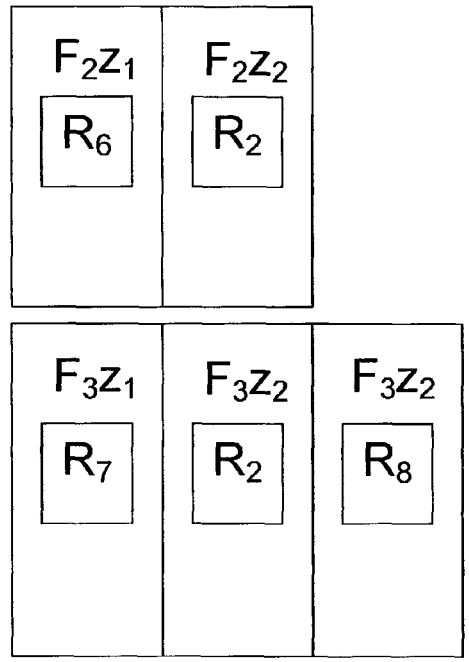
Figure 5J:
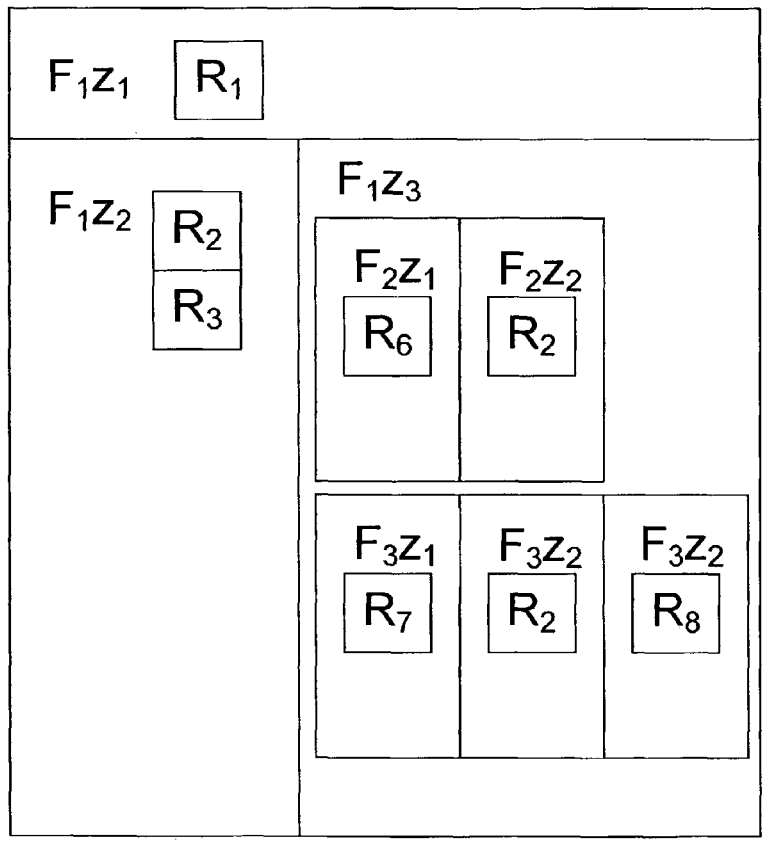

FIG. 5h shows combined layout, $CL_1=L_1+L_2$, on framework, $F_1$, and FIG. 5i shows combined layout, $CL_2=L3+L4$, on frameworks, $F_2$ and $F_3$, respectively. Finally, FIG. 5j shows the final result on framework, $F_1$, i.e. with frameworks $F_2$ and $F_3$ embedded in $F_1$ according to $CL_1$.

Layout Designations (LD)

Reference is now made to FIGS. 6a-6e. It is possible to a given layout or Combined layout to assign a certain designation when used as a sub layout (when being merged with another layout). A layout designation is especially useful when making sub-layouts that are only to be included in another layout.

Figure 6A:
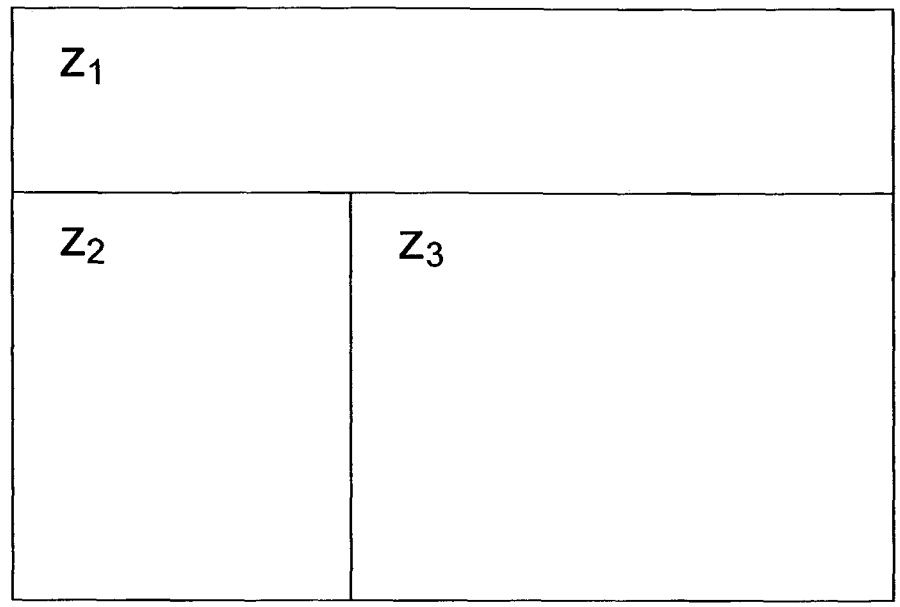
FIGS. 6a-6e illustrate layout designations according to the invention.
Figure 6B:
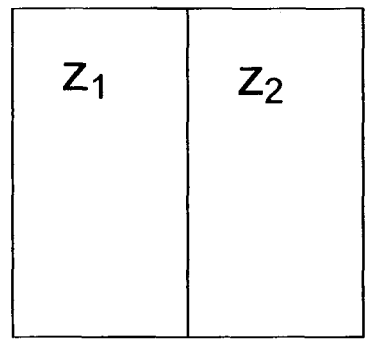

FIG. 6a shows framework, $F_1$, comprising three zones, and FIG. 6b shows framework, $F_2$, comprising two zones.

Figure 6C:
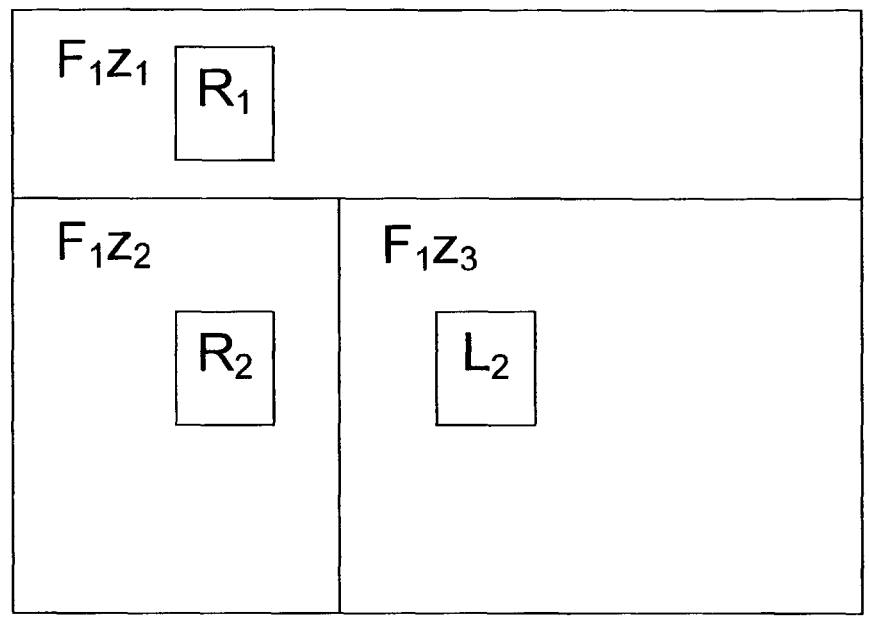
Figure 6D:
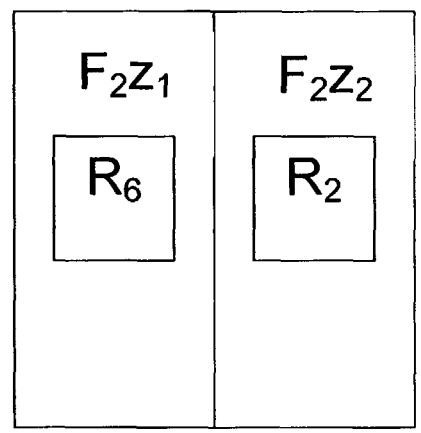

FIG. 6c shows layout, $L_1$, on framework, $F_1$, and FIG. 6d shows layout, $L_2$, on framework, $F_2$.

Figure 6E:
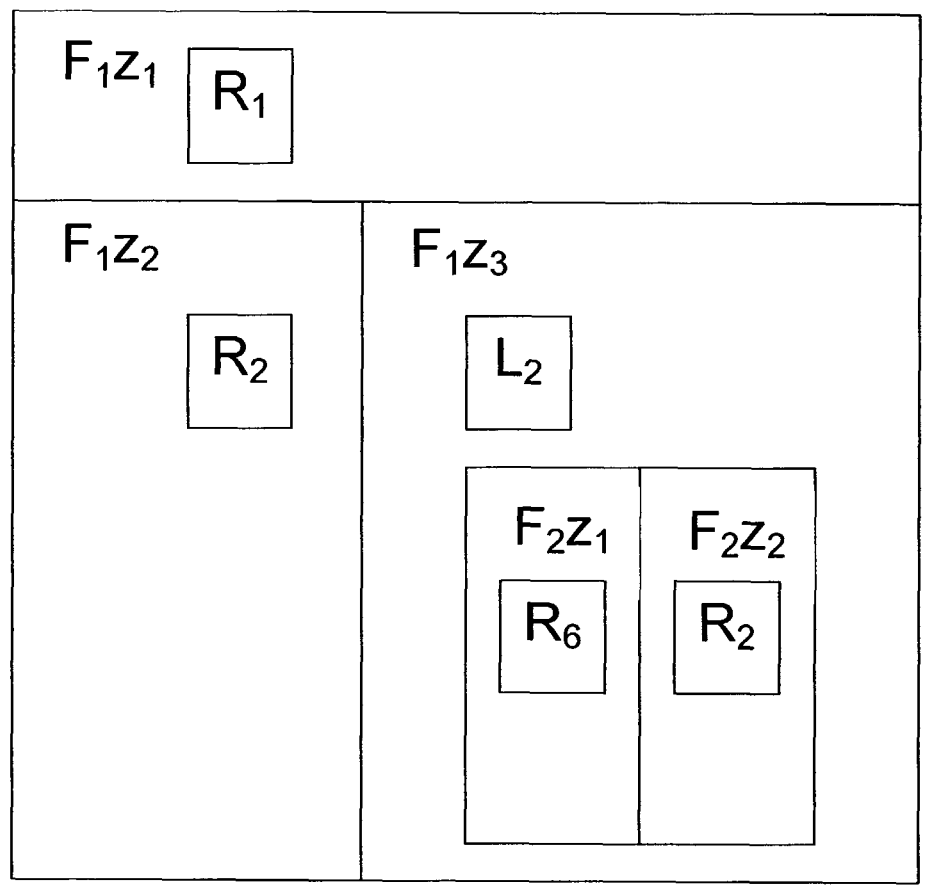

If specified $L_2(LD)=L_1z_3$ the result would be as shown in FIG. 6e, which shows combined layout, $CL_1=L_1+L_2$, since $L_2$ is to be placed in $F_1z_3$ by default.

Layout designations are usually used when there are several sub layouts that are only used as sub layouts in one layout (e.g. one master layout and a number of sub layouts).

Example

Danish Adventures

A design for an entire web site can be defined as illustrated in FIGS. 7a-10d.

Figure 7A:
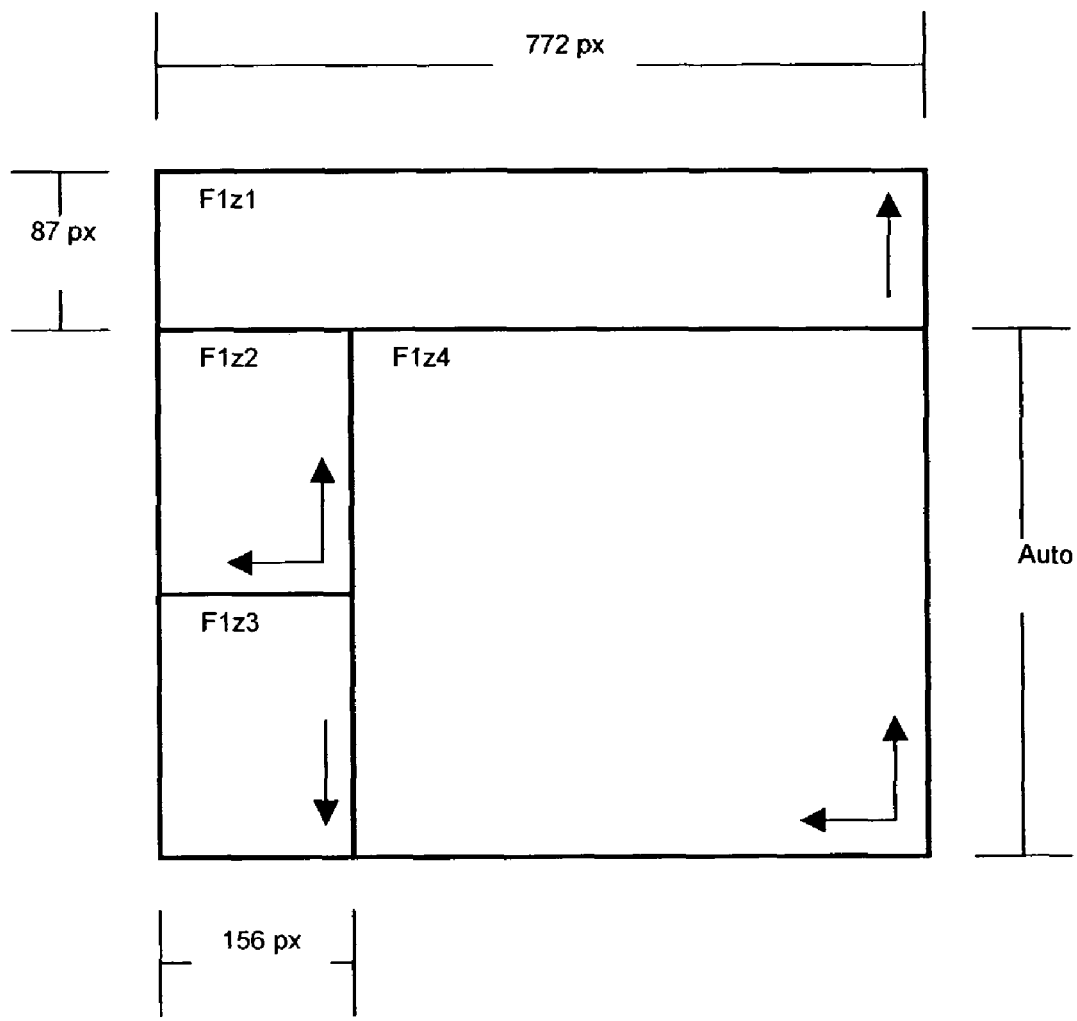
FIGS. 7a-7c show an example of the design of a web site according to the invention.
Figure 7B:
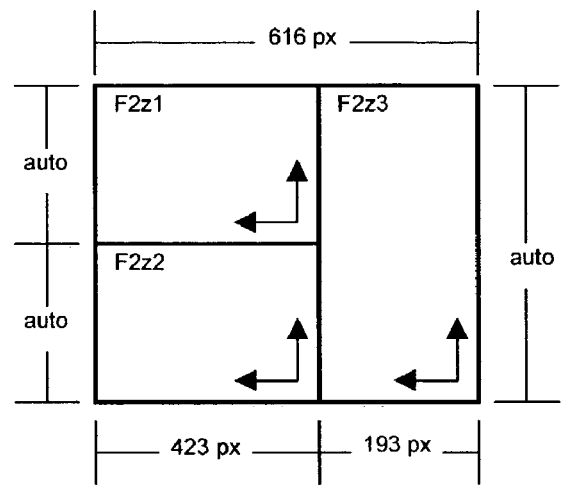
Figure 7C:
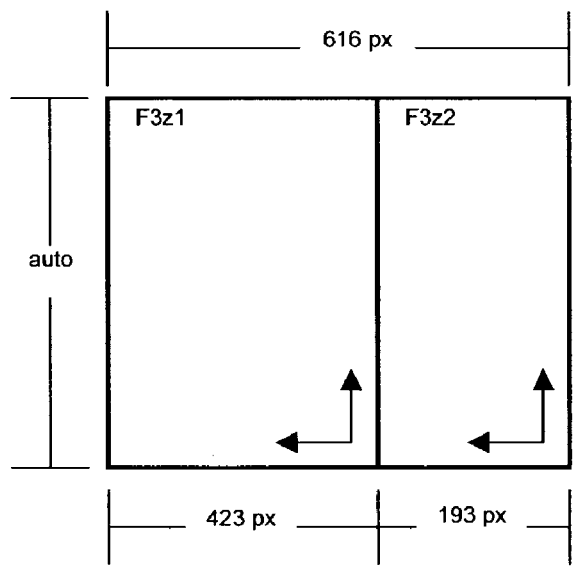

FIG. 7a shows a framework, $F_1$, FIG. 7b shows another framework, $F_2$, and FIG. 7c shows even another framework, $F_3$.

Figure 8A:
FIGS. 8a-8g show various rendering elements used in a web site according to the invention.
Figure 8B:
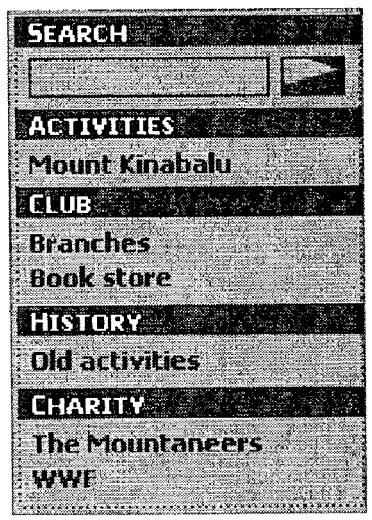
Figure 8C:
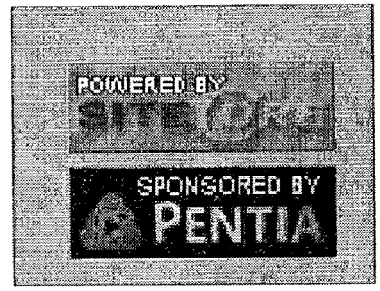
Figure 8D:
Figure 8E:
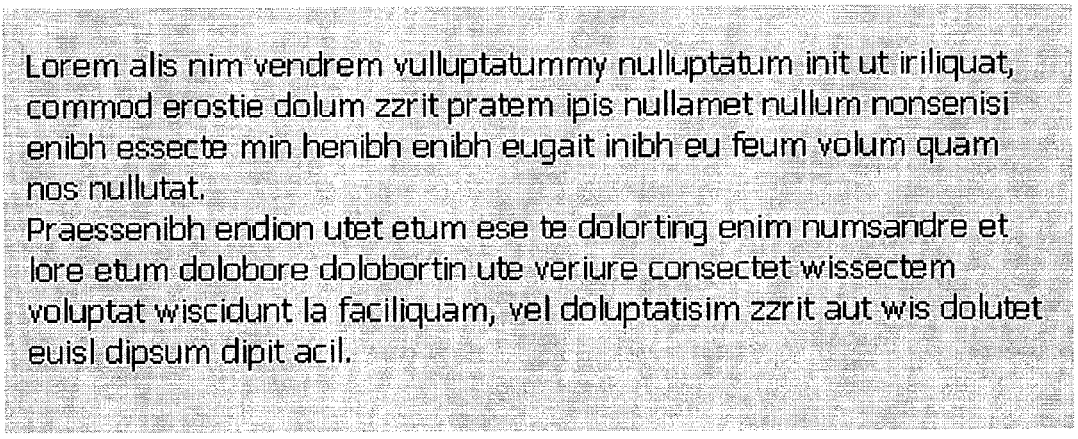
Figure 8F:
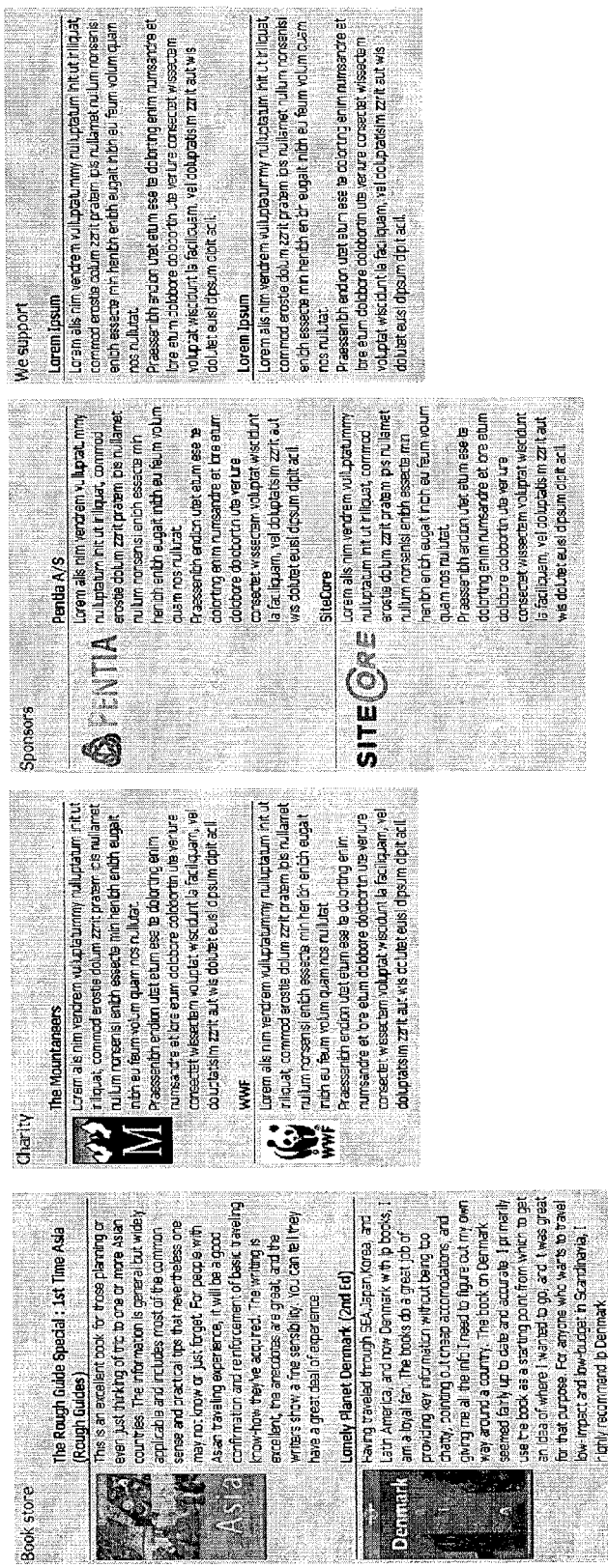
Figure 8G:

FIGS. 8a-8g show the rendering elements used in this example. FIG. 8a shows the top bar, $R_1$. The top bar component renders a global menu. FIG. 8b shows the left menu (leftmenu.xsl), $R_2$. The left menu renders the main navigation on the site. FIG. 8c shows the LinkImage (linkimage.xsl), $R_3$. The LinkImage Rendering component simply displays a piece of graphics. FIG. 8d shows the local menu (localmenu.xsl), $R_4$. The local menu is the menu that is attached to a single piece of content, such as a document. FIG. 8e shows the document (document.xsl), $R_6$. The document Rendering component is the most common component, and is used to display a piece of HTML text. FIG. 8f shows the basis list (basislist.xsl), $R_6$. The basis list Rendering component is a single component that displays a list of sub documents. It may vary in design, but contains the same number of fields (heading, body text, image). FIG. 8g shows the activity list (activitylist.xsl), $R_7$. This is much like $R_6$, except that it also contains a date field.

With the above frameworks and rendering components, the site layouts can be defined as shown in FIGS. 9a-9e.

FIG. 9a shows the master layout, L, in which:

$L_1 \rightarrow F_1: \{R_3 \rightarrow F_1z_1, R_1, \rightarrow F_1z_1, R_2 \rightarrow F_1z_2, R_3 \rightarrow F_1z_3, R_3 \rightarrow F_1z_3\}$ FIG. 9b shows the front page layout, $L_2$, in which:

$L_2 \rightarrow F_2: \{R_5 \rightarrow F_2z_1, R_7 \rightarrow F_2x_2, R_4 \rightarrow F_2z_3\}$ Furthermore, $L_2(LD)=L_1z_4$, i.e. the result of $L_2$ should be inserted in $z_4$ of $L_1$.

FIG. 9c shows the document layout, $L_3$, in which:

$L_3 \rightarrow F_3: \{R_5 \rightarrow F_3z_1, R_4 \rightarrow F_3z_2\}$

Furthermore, $L_3(LD)=L_1z_4$, i.e. the result of $L_3$ should also be inserted in $z_4$ of $L_1$.

FIG. 9d shows the basis list layout, $L_4$, in which:

$L_4 \rightarrow F_3: \{R_6 \rightarrow F_3z_1, R_4 \rightarrow F_3z_2\}$

Furthermore, $L_4(LD)=L_1z_4$, i.e. the result of L should also be inserted in $Z_4$ of $L_1$.

Finally, FIG. 9e shows the activity list layout, $L_5$, in which:

$L_5 \rightarrow F_3: \{R_7 \rightarrow F_3z_1, R_4 \rightarrow F_3z_2\}$

Furthermore, $L_5(LD)=L_1z_4$, i.e. the result of $L_5$ should also be inserted in $z_4$ of $L_1$.

Figure 10A:
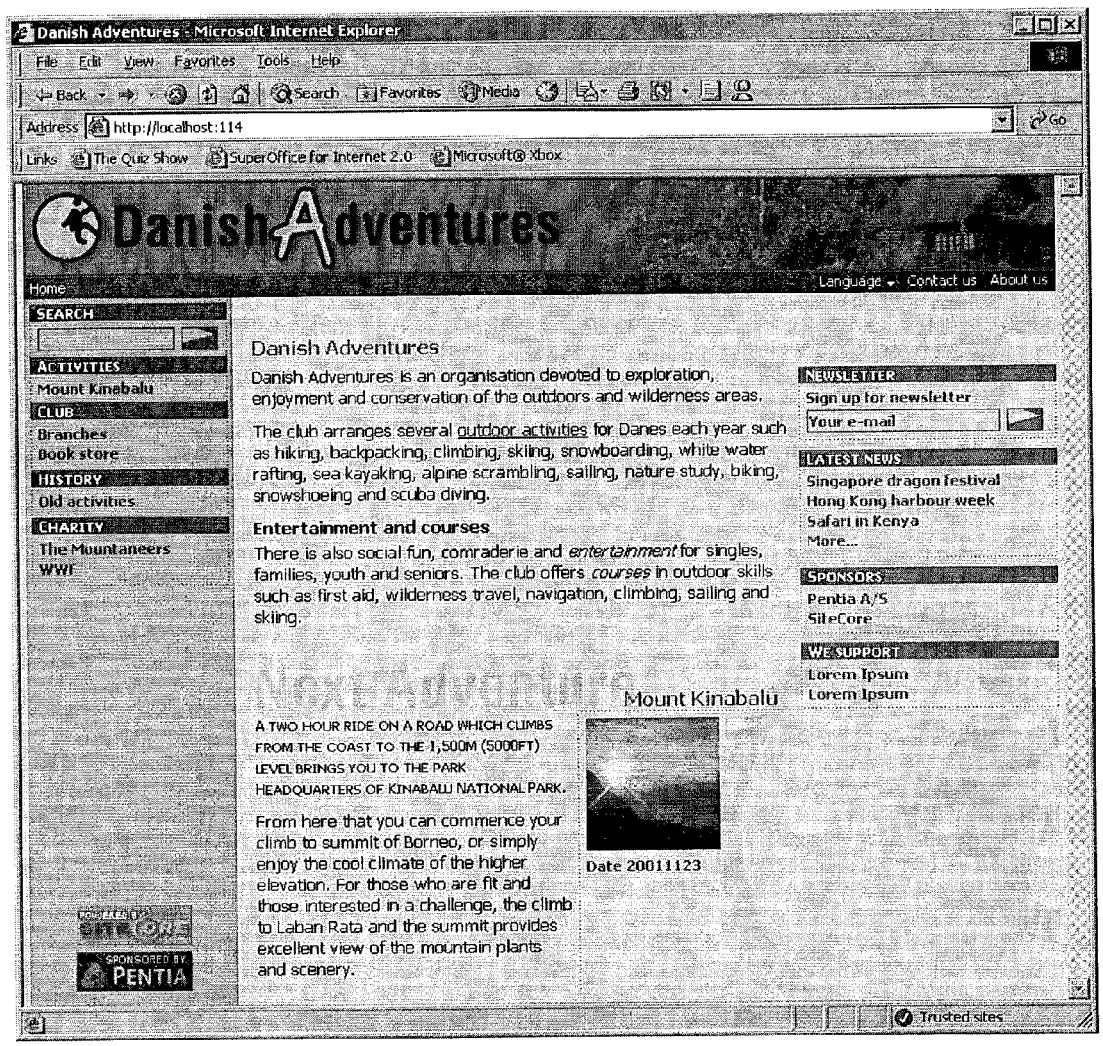
FIGS. 10a-10d show examples of complete web sites according to the invention.
Figure 10B:
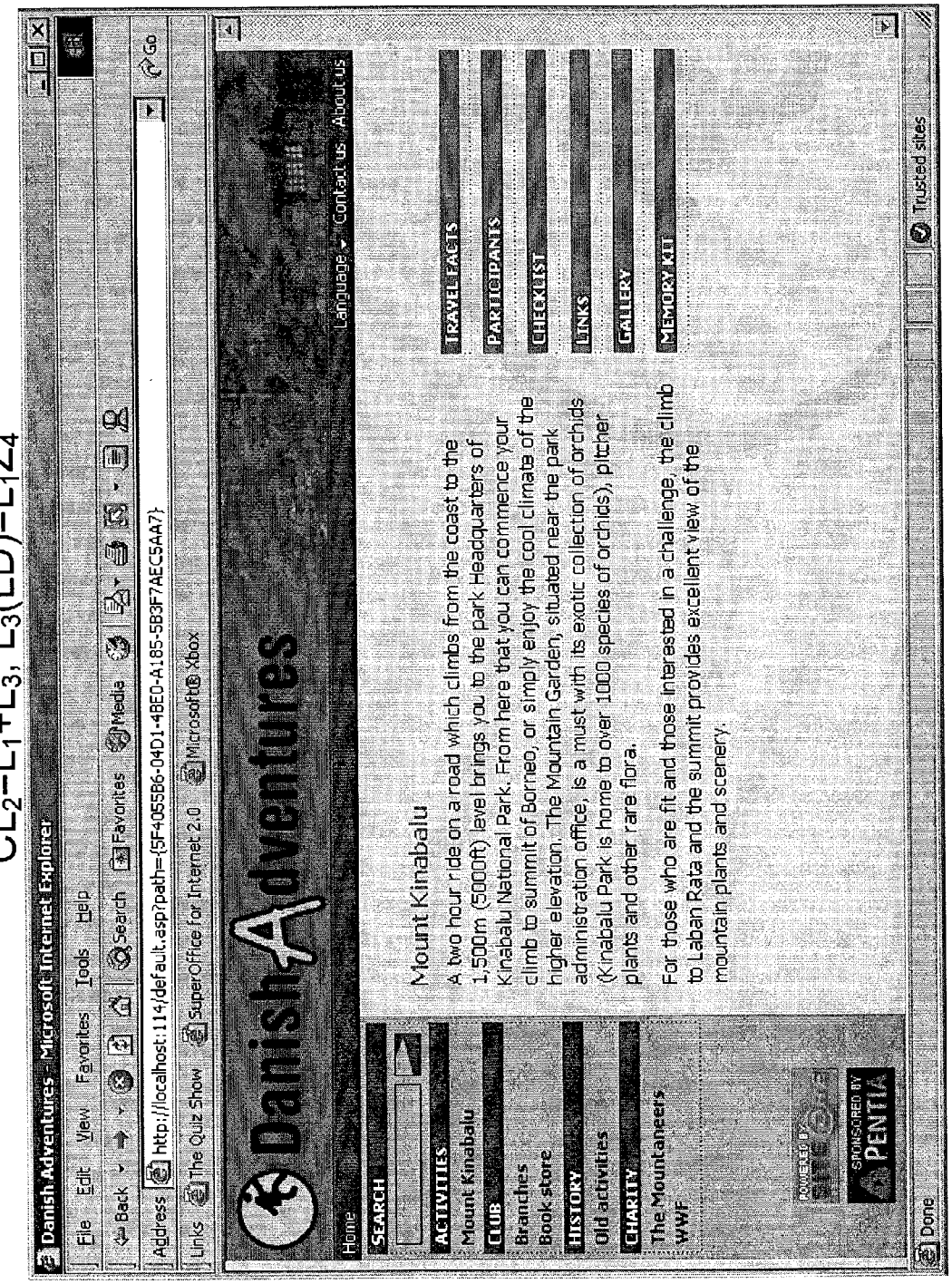
Figure 10C:
Figure 10D:
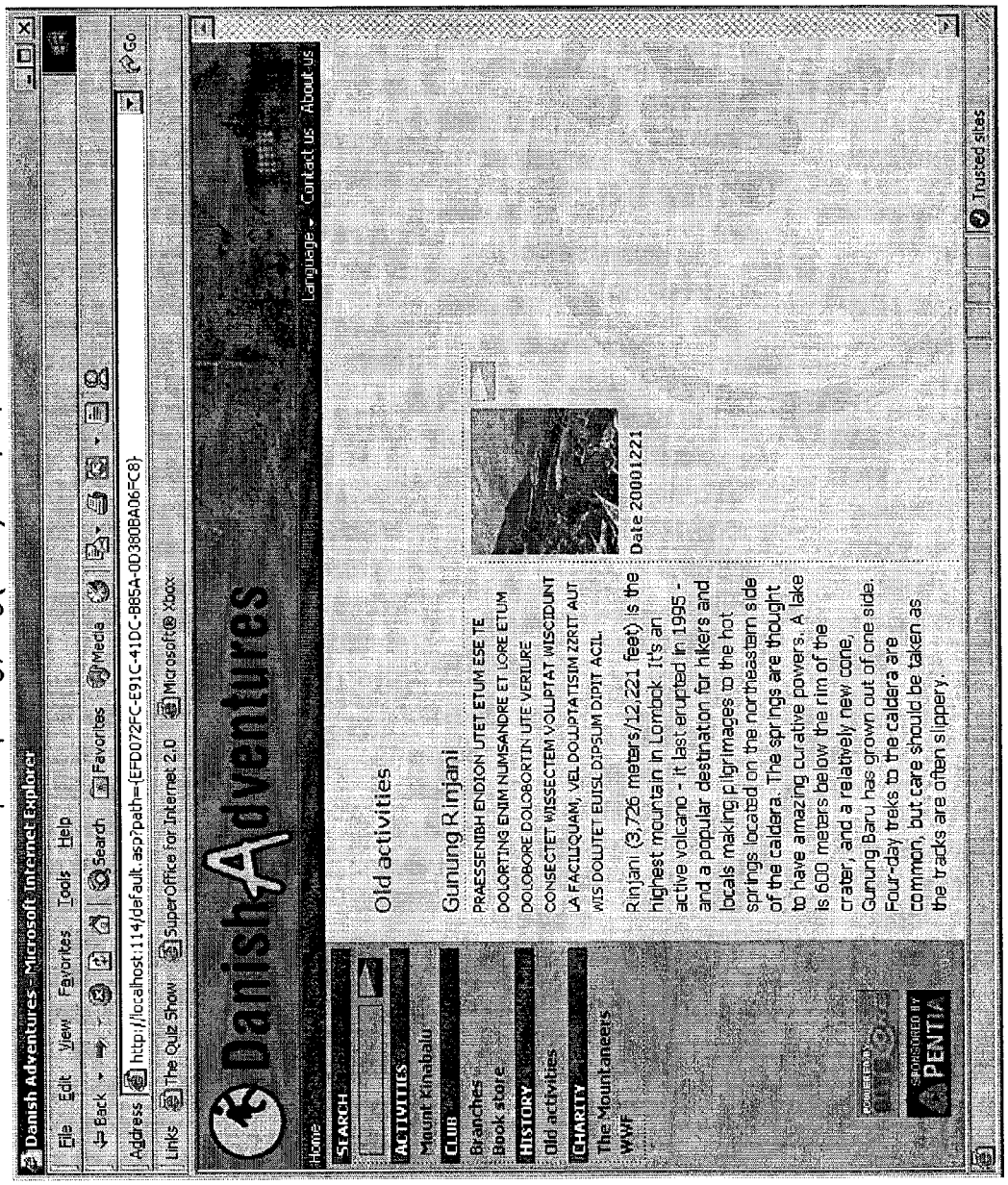

Given the five layouts described above, the entire web site would appear as shown in FIGS. 10a-10d. FIG. 10a shows $CL_1=L_1+L_2$, FIG. 10b shows $CL_2=L_1+L_3$, FIG. 10c shows $CL_3=L_1+L_4$, and FIG. 10d shows $CL_4=L_1+L_5$.

Thus, a method for managing and/or producing an output has been provided which provides an easy to use tool for creating web sites which does not impose restrictions on the obtainable complexity of the resulting output. The method according to the invention is well suited for managing and/or producing a web site. Furthermore, the invention provides a tool for easily updating and/or maintaining such a web site.

The invention claimed is:

1. A computer implemented method for producing a web page, the method comprising the steps of:
providing a plurality of layouts, each of the layouts containing design and being capable of generating output, each of the layouts being divided into a number of zones, the layouts in combination substantially covering the web page, each of the layouts defining arrangement of the corresponding zones of the layouts,
providing a number of rendering elements, each being adapted to perform a function and/or an action for generating a content presentable on the web page,
assigning one or more relations and/or one or more orderings between the rendering elements and the zones, designating at least a second layout to a corresponding zone of a first layout using the one or more relations and/or the one or more orderings between the rendering elements, the layouts and the zones, and designating at least a third layout and/or a rendering element to a corresponding zone of the second layout using the one or more relations and/or the one or more orderings between the rendering elements, the layouts and the zones, generating, for each of the layouts, an output by processing the layout, using the layout itself and the layout's rendering elements, and based on the one or more relations and/or the one or more orderings, wherein each of the outputs generated by the layouts is adapted to constitute a part of the content to be presented on the web page, wherein the web page is generated on a computer, and collecting the outputs generated by each of the layouts by merging the outputs into a final content to be presented on the web page, said merging being performed in accordance with the designations of each of the layouts, wherein the collecting step is performed by the computer, wherein the final content to be presented on the web page is dynamically updatable by independently altering at least one of the designation(s) of a third layout and/or a rendering element to a zone of the second layout.

2. A method according to claim 1, further comprising the step of:

recursively resolving all of the layouts into rendering elements until each zone and each layout can be processed using rendering elements.

3. A method according to claim 1, wherein the step of generating is performed in such a way that the content of each zone is generated independently of each of the other zones.

4. A method according to claim 1, wherein the step of assigning one or more relations and/or one or more orderings between the rendering elements and the zones is performed in such a way that, for at least one of the zones, relation(s) and/or ordering(s) between said zone(s) and two or more rendering elements is provided.

5. A method according to claim 1, wherein the step of assigning one or more relations and/or one or more orderings between the rendering elements and the zones comprises combining at least two layouts in such a way that, for each zone, the relation(s) and/or ordering(s) comprises an addition of the relation(s) and/or ordering(s) for each of the at least two layouts.

6. A method according to claim 1, further comprising the step of redefining the web page by altering the one or more relations and/or the one or more orderings between the rendering elements and the zones.

7. A method according to claim 1, further comprising the step of redefining the web page by altering one or more of the rendering elements and/or by replacing one or more of the rendering elements with one or more different rendering elements.

8. A method according to claim 1, further comprising the step of making the web page available via a communication network.

9. A method according to claim 8, wherein the communication network is a global communication network.

10. A method according to claim 1, wherein the used data format is based on Extensible Markup Language (XML).

11. A method according to claim 1, wherein the rendering elements are based on Extensible Stylesheet Language Transformations (XSLT).

12. A method according to claim 1, wherein the rendering elements are based on .NET.

13. A method according to claim 1, further comprising the step of generating structured data by means of the rendering elements.

14. A method according to claim 1, further comprising generating web services by means of the rendering elements.

15. A method according to claim 1, wherein the rendering elements are adapted to generate a visual output, and wherein the step of generating content is performed by displaying the visual output of each of the zones on the web page.

16. A method according to claim 1, wherein the rendering elements are adapted to process a layout.

17. A method according to claim 1, further comprising the steps of:

caching the generated content from one or more of the zones and/or from one or more of the rendering elements and/or from one or more of the layouts, and/or the web page, and using the cached content at a later time.

18. A method according to claim 1, wherein at least one of the rendering elements comprises an ordered sequence of rendering elements, the output of each of the rendering elements of said sequence being used as an input to the subsequent rendering element.

19. A method according to claim 1, further comprising the steps of:

receiving structured data, said structured data being divided into substructures, assigning one or more layouts to each substructure, and processing each substructure in such a way that the assigned layout(s) is/are processed, resulting in an output.

20. A method according to claim 19, further comprising the step of placing an editor on the structured data.

21. A method according to claim 1, wherein each of the layouts points to a framework $F_n$.

* * * * *